United States Patent [19]

Kimura

[11] Patent Number: 5,721,626
[45] Date of Patent: Feb. 24, 1998

[54] IMAGE READING DEVICE AND METHOD FOR CORRECTING IMAGE EXPOSURE DATA

[75] Inventor: Keita Kimura, Kawasaki, Japan

[73] Assignee: Nikon Corporation, Tokyo, Japan

[21] Appl. No.: 432,943

[22] Filed: May 1, 1995

[30] Foreign Application Priority Data

Aug. 31, 1994 [JP] Japan ................................ 6-230389

[51] Int. Cl.⁶ ...................................................... H04N 1/028
[52] U.S. Cl. ............................ 358/482; 358/474; 358/475; 358/497
[58] Field of Search ........................... 358/475, 482–483, 358/497, 486, 494, 474

[56] References Cited

U.S. PATENT DOCUMENTS 4,692,797  9/1987  Matsumoto ........................... 358/506
5,038,227  8/1991  Koshiyouji et al. .................. 358/471
5,357,351 10/1994  Nakajima et al. ..................... 358/496

*Primary Examiner*—Edward L. Coles, Sr.
*Assistant Examiner*—Stephen Brinich
*Attorney, Agent, or Firm*—Oliff & Berridge, P.L.C.

[57] ABSTRACT

An image reading device comprises a line sensor that moves in an auxiliary scanning direction, a resolution setting device which sets the resolution of the line sensor in the auxiliary scanning direction, an exposure correction value setting device that sets an exposure correction value when the image is read, and a control device that performs exposure correction by multiplying the moving velocity of the line sensor and the accumulation time of the line sensor by correction factors. To correct the base concentration while reducing the effects of deterioration of the S/N ratio and level-skipping, a rough adjustment of the exposure is conducted by a gain circuit, a fine adjustment is conducted with reference to a first look-up table, and a further fine adjustment of the original document base concentration is conducted with reference to a second look-up table.

25 Claims, 5 Drawing Sheets

IMAGE READING DEVICE AND METHOD FOR CORRECTING IMAGE EXPOSURE DATA

BACKGROUND OF THE INVENTION

1. Field of the Invention

The present invention relates to image reading devices and, in particular, to an image reading device that performs adjustments of image exposure data.

2. Description of Related Art

In conventional image reading devices, image exposure data is adjusted by a gain circuit and a first look-up table, and the original document base concentration is adjusted using a second look-up table.

However, in conventional image reading devices, the adjustment by the first and second look-up tables must coincide. This results in images being formed in only a narrow portion of the input exposure range, which deteriorates signal-to-noise (S/N) ratio and causes level skipping.

SUMMARY OF THE INVENTION

In consideration of the foregoing problems, it is an object of the present invention to provide an image reading device that reduces the effects of S/N ratio deterioration and level skipping even though the image exposure data is roughly adjusted using a gain circuit and finely adjusted using a first look-up table, and the original document base concentration is further refined using a second look-up table.

To achieve the above objective, the image reading device according to one aspect of the present invention comprises a line sensor that moves in an auxiliary scanning direction, a resolution setting device that arbitrarily sets the resolution of the line sensor in the auxiliary scanning direction, an exposure correction value setting device that sets an exposure correction value when the image is read, and a control device that performs image exposure data correction.

When the moving velocity of the line sensor has been set to $S \times a^n$ based on the resolution set by the resolution setting device, the accumulation time of the line sensor is computed and a level exposure correction value of $+m$ is set by the exposure correction value setting device, and the moving velocity of the line sensor is multiplied by $1/a^m$ and the accumulation time of the line sensor is multiplied by $a^m$ by the control device. Consequently, correction of the base concentration can be performed while reducing the effects of S/N ratio deterioration and level skipping.

These and other aspects and advantages of the present invention are described or apparent from the following detailed description of the preferred embodiments.

BRIEF DESCRIPTION OF THE DRAWINGS

The preferred embodiments are described with reference to the drawings in which.

DETAILED DESCRIPTION OF PREFERRED EMBODIMENTS

A preferred embodiment of the present invention is described hereafter, with reference to the drawings.

Figure 1:
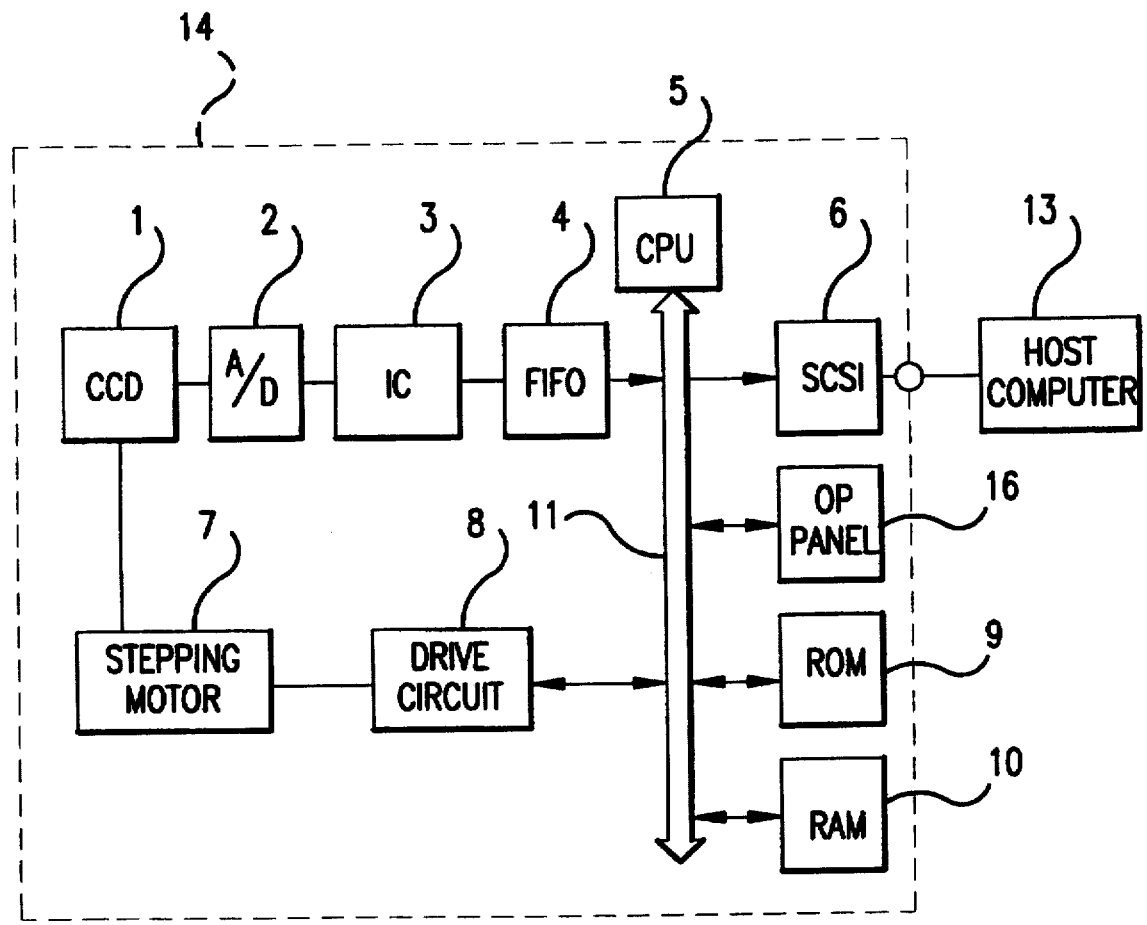
FIG. 1 is a block and line diagram showing a preferred embodiment of an image reading device according to the present invention.
Figure 2:
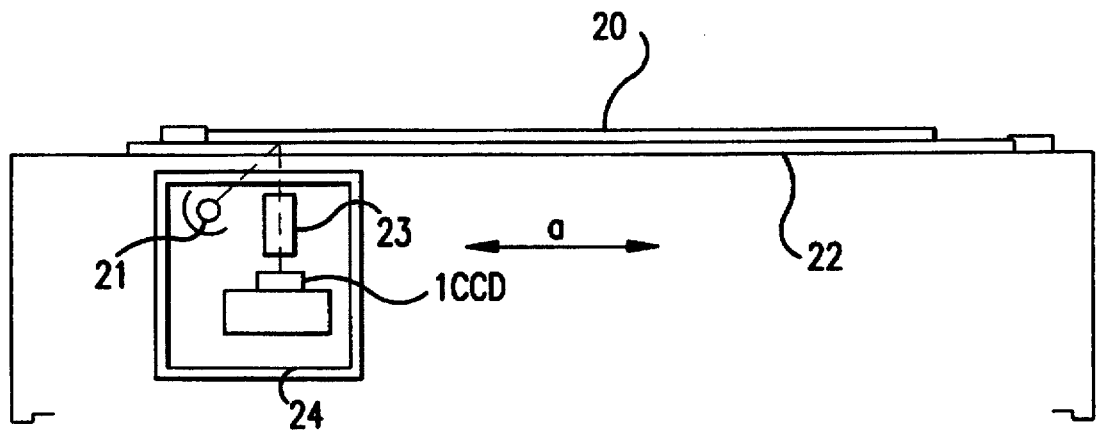
FIG. 2 is a frontal view of an image reading device according to the present invention.
Figure 3:
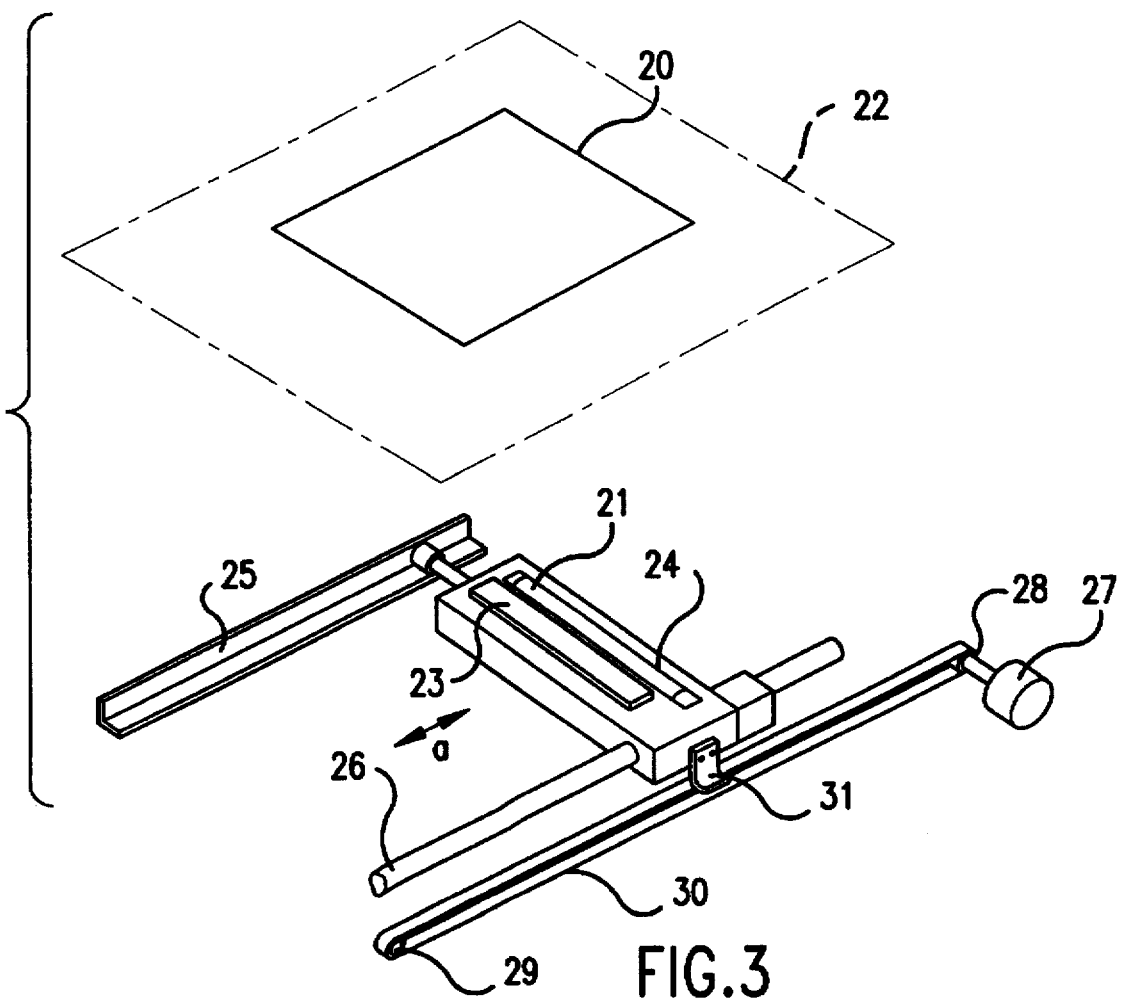
FIG. 3 is an oblique view of an image reading device according to the present invention.

As shown in FIGS. 1–3, light is emitted by light source 21 and reflected by original document 20 (FIG. 2). The input image light rays reflected from original document 20 are supplied to CCD line sensor 1 via lens 23. The input image light rays are photoelectrically converted by CCD line sensor 1 and become electrical analog signals. The analog signals are converted to digital signals by an A/D converter 2, and CPU 5 inputs this signal to RAM 10 via image processing circuit 3 and FIFO buffer 4.

After reading of one line has been completed, stepping motor 7 is controlled by CPU 5, and CCD line sensor 1 moves to the next reading position in the auxiliary scanning direction (the direction indicated by arrow a in FIGS. 2 and 3). CPU 5 controls driving of stepping motor 7 by the stepping motor drive circuit 8. Stepping motor 7 drives carriage 24 in the auxiliary scanning direction by the timing gear 28, timing pulley 29, timing belt 30 and connecting member 31. CCD line sensor 1 is mounted on carriage 24, and moves in the auxiliary scanning direction while being guided by guide plate 25 and guide shaft 26.

CCD line sensor 1 performs reading of one line in the primary scanning direction and then moves to the next position in the auxiliary scanning direction by stepping motor 7. The entire single sheet of original document 20 is read by repeating this process.

In the present invention, the exposure and the resolution in the auxiliary scanning direction have the following relationship:

$$\text{time} = 1/(\text{ref} \times \text{pit} \times \text{spd}) \quad (1)$$

where:

time is the accumulation time of the CCD line sensor (msec), ref is the reading resolution (dpi), pit is the carriage scroll pitch (inch), and spd is the carriage scroll velocity (pps).

By using the stepping motor 7 for scrolling the carriage 24, speed control can be conducted by open loop control providing for an extremely simple configuration. However, freely controlling the speed of stepping motor 7 in a continuous manner is not practical because of level skipping and noise production. Accordingly, it is desirable for the motor to be operated at several predetermined speeds.

By using Equation 1, if the carriage scrolling speed is set at predetermined speeds and the reading resolution is freely selected, then the accumulation time of the CCD line sensor may be varied.

Suppose, for example, the scrolling speeds of carriage 24 to be a geometric series with a factor of 2 (SPD1, SPD2 (SPD1×2), SPD3 (SPD2×), . . . ). The accumulation time may be varied within a width of a factor of 2 by the resolution setting means because the scrolling speed of carriage 24 is switched at the level where the accumulation time must exceed the factor of 2.

Figure 4:
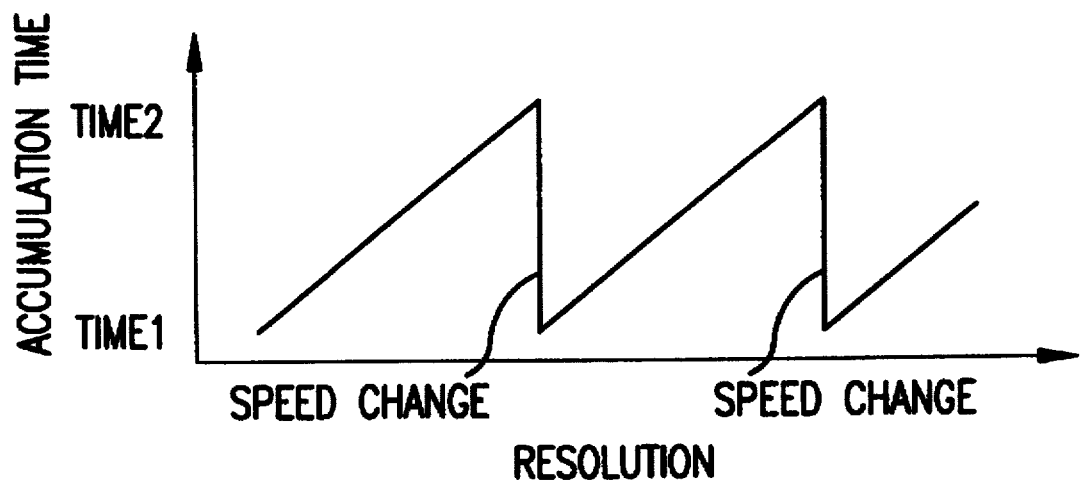
FIG. 4 is a characteristics diagram having three levels of scrolling speeds according to the present invention.

As shown in FIG. 4, if three levels of scrolling speeds (SPD1, SPD2 and SPD3) are set, then the permissible setting range of the reading resolution setting means will have a width of $2^3$ when the reading resolution is selected so that the accumulation time ranges from TIME1 to TIME2.

Figure 5:
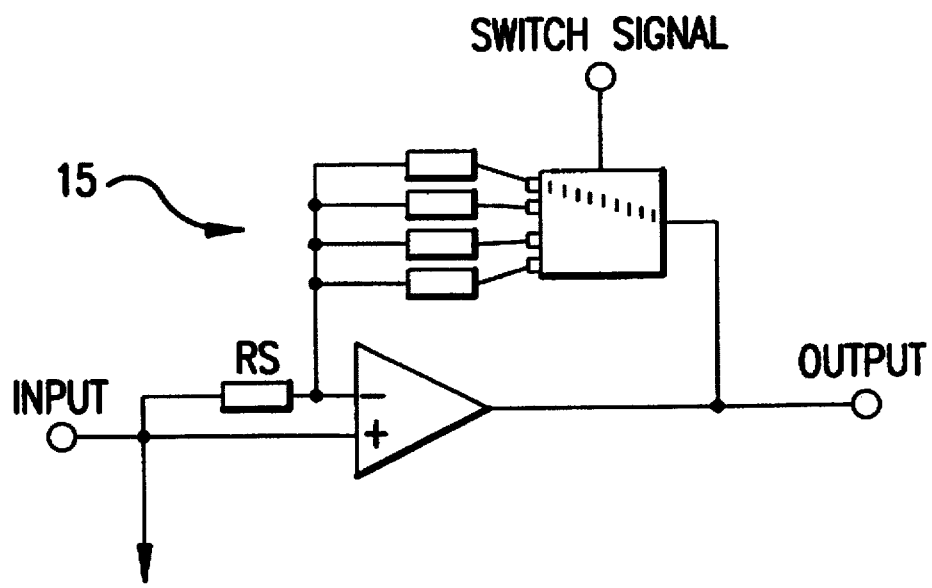
FIG. 5 is a block diagram showing a gain circuit of the present invention.

Using this method, the image exposure causes the gain (amplification rate) of the output signal from the CCD line sensor 1 to continuously vary with respect to the accumulation time. However, because costs become extremely large when the gain is continuously varied, the gain is set at several predetermined levels in increments of 20–30%. As shown in FIG. 5, the gain may be set to four levels by a gain circuit 15. Gain circuit 15 is well known in the art, so a detailed description is omitted here. For example, gain circuit 15 may be connected between CCD line sensor 1 and A/D converter 2 and a switching signal (gain setting signal) may be supplied from CPU 5.

Figure 6:
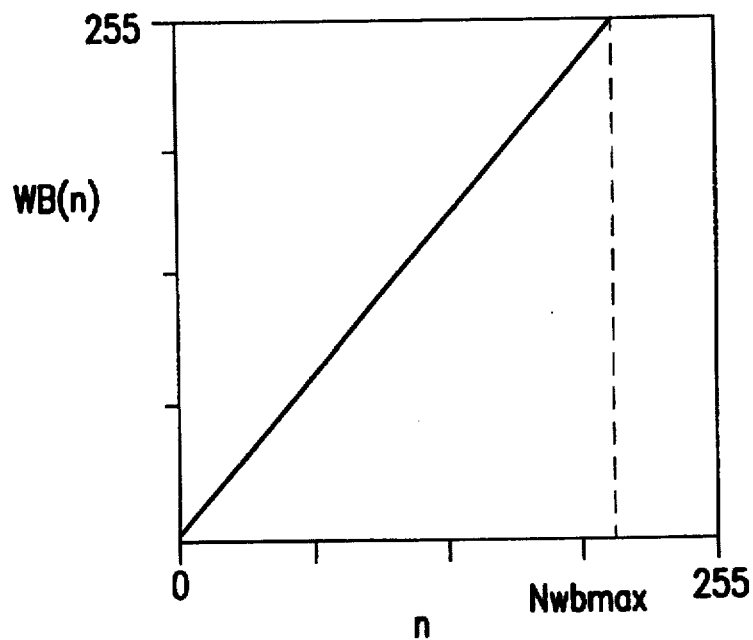
FIG. 6 is a characteristics diagram of WB(n) of the present invention.

Image exposure data that has undergone a rough adjustment by the gain circuit 15 is further adjusted using a first look-up table (LUT). An accumulation time and gain are determined for a given resolution. FIG. 6 shows the output level, WB(n), of the white chart when the image exposure is determined by the first LUT using the determined accumulation time and gain. Nwbmax corresponds to the brightest point obtained in the image where the first LUT outputs a WB(n) value of 255. Thus, an appropriate image exposure value is obtained by passing the image through the first LUT.

However, when the original document 20 is a reflective original document, the paper may have several base concentrations. Further, when original document 20 is a transmissive document, the paper may have a zero base concentration of film. As a result, the paper may have a base concentration of approximately 0.1 to 0.3. Thus, when an image within this range is read under white chart exposure conditions, the image becomes dark naturally by the amount of base concentration.

Figure 7:
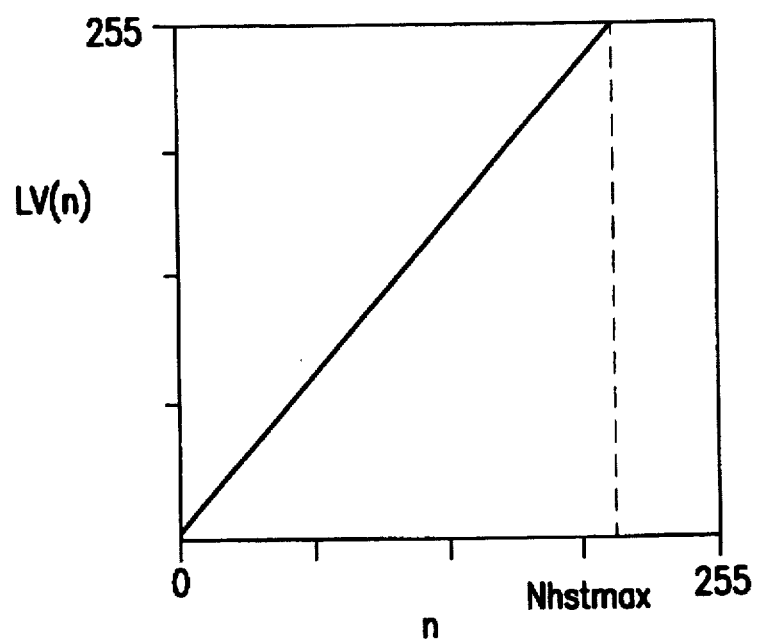
FIG. 7 is a characteristics diagram of LV(n) of the preferred embodiment of the present invention.

In order to solve this problem, a correction is made using a second LUT. FIG. 7 shows the output level, LV(n), when the exposure is determined by the second LUT. Nhstmax corresponds to the brightest point obtained in the image where the second LUT outputs a LV(n) value of 255. Thus, an appropriate image exposure value is always obtained by passing the input image through the second LUT.

However, the image can be formed only in a narrow portion of the input range and the S/N ratio deteriorates and level skipping occurs. To correct this problem, the speed of stepping motor 7 is more finely divided. For example, the speed is set to a power of $2^{1/3}$ ($a=2^{1/3}$). In the above geometric series with a power of 2, a fluctuation in Nwbmax occurred in the range 255–128. However, using a geometric series with a factor of $2^{1/3}$, the fluctuation of Nwbmax occurs only in the range 255–202.

When a base concentration is generated, the motor speed is decreased by 1 to 3 levels after the exposure is determined. Using these exposure conditions as a standard, the accumulation time is also increased by a similar amount to satisfy Equation 1. Thus, it is possible to correct the exposure in units of ⅓ EV. By so doing, the effects of S/N ratio deterioration and level skipping are reduced, making it possible to form an image eliminating the effects of the base concentration component on the order of 0.1.

In general, when the factor of the motor speed is a, the exposure correction amount for one level is $\log_2 a$ EV, and the base concentration component correction is $\log_{10} a$. Thus, it becomes possible to continuously set the resolution with a simple control using the stepping motor 7, even though the motor speed and gain circuit 15 are restricted to several levels, to provide a high quality image reading device.

Figure 8:
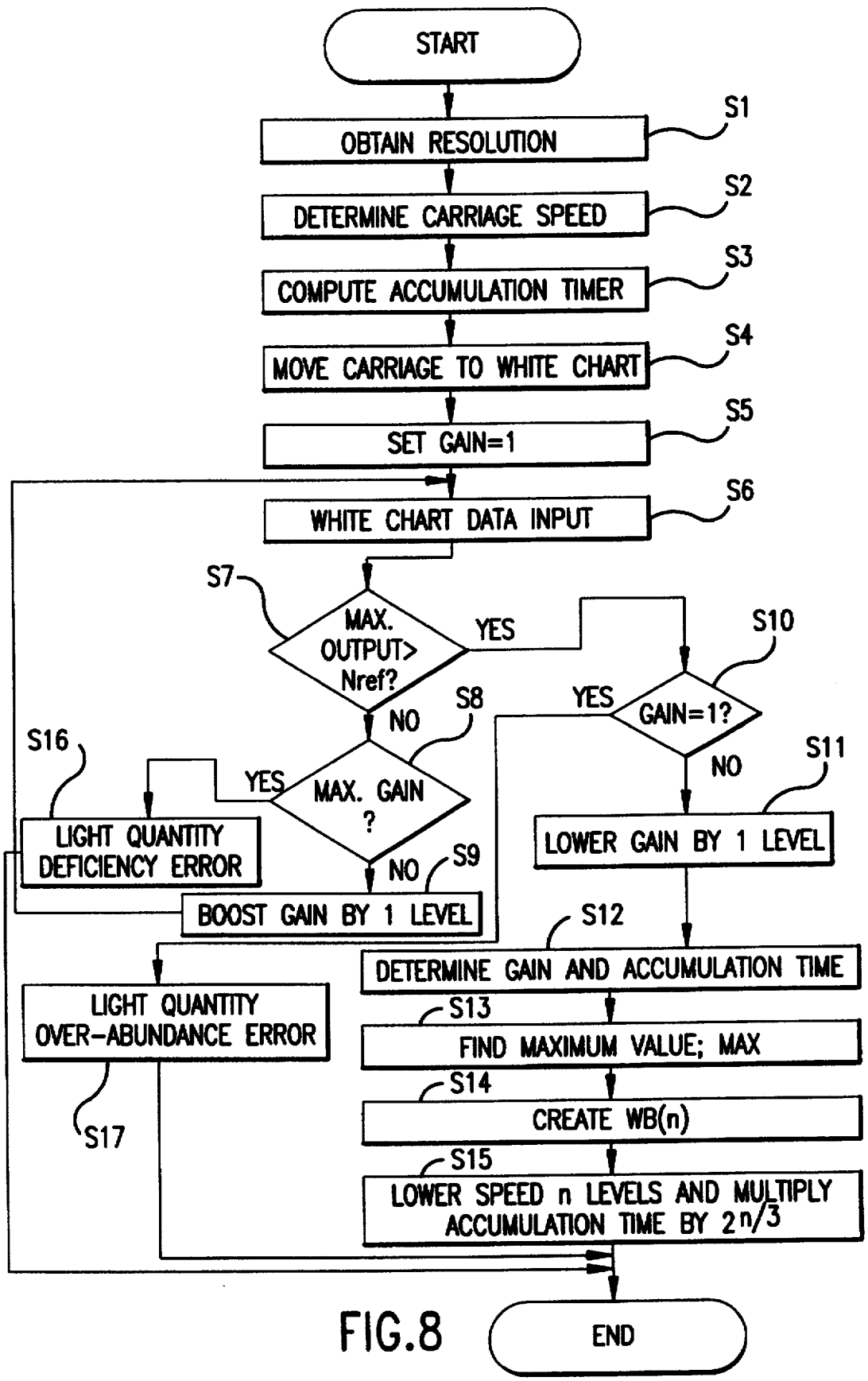
FIG. 8 is a flowchart according to the present invention.

As described below, the exposure setting sequence of CPU 5 is described with reference to the flowchart shown in FIG. 8. The exposure setting is conducted, for example, in a scanner in which the reading resolution can be freely selected within the range 50 to 200 dpi. The gain is considered to be in four levels, with the increase in amplification rate being 1.3×per level. These gains will be called No. 1 to No. 4, starting with the lowest amplification rate. The carriage speeds are taken to be a geometric sequence with a factor of $2^{1/3}$.

First, when the program starts, the reading resolution, ref, in the auxiliary scanning direction is obtained (step S1) and set by the operation of an operation panel 16 (FIG. 1). Next, in step S2, the carriage scroll velocity, spd, is determined from the reading resolution in the following manner:

| Reading Resolution (dpi) | Carriage Velocity (Spd) |
|---|---|
| 50–62 | SPD1 |
| 63–79 | SPD2 |
| 80–99 | SPD3 |
| 100–125 | SPD4 |
| 126–158 | SPD5 |
| 129–200 | SPD6 |

In step S3, the accumulation time is computed using Equation 1. Next, the carriage moves to the white chart (step S4) and the gain is set to 1 (step S5).

In step S6, the white chart data is input. In step S7, the determination is made as to whether the white chart maximum output value exceeds a standard value limit, Nref (e.g. 240). When the white chart maximum output value exceeds Nref, the CPU moves to step S10. When the white chart maximum output value does not exceed Nref, the CPU returns to step S6 depending on the result of step S8 and after performing step S9.

In step S8, the determination is made as to whether the gain is a maximum. When the gain is not a maximum, the CPU returns to step S6 after boosting the gain by 1 level in step S9. When the gain is a maximum, a light quantity deficiency error process is performed in step S16 and the program terminates.

In step S10, a determination is made as to whether the gain is 1 if the maximum output value exceeds Nref. When the gain is 1, a light quantity over-abundance error process is performed in step S17 and the program terminates.

When the gain is not 1, the CPU moves to step S12 after lowering the gain by one level in step S11.

In step S12, the obtained gain and accumulation time are determined. In step S13, white chart data is once more extracted at the obtained gain and accumulation time to find the maximum value Nmax. WB(n) of the LUT (FIG. 6), which outputs the white standard measurement value at a maximum value Nmax, is created in step S14. When the indication is that the exposure correction is n levels, the motor speed is decreased by n levels, the accumulation time is multiplied by $2^{1/3}$ (step S15), and the program ends.

When the above actions are accomplished for each color, an output balance for each color is obtained in addition to determining the exposure. Consequently, the white balance is also adjusted automatically.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image reading device, comprising:
   a line sensor having a moving velocity in an auxiliary scanning direction and an accumulation time for reading an image on a document and outputting an image signal;
   a resolution setting device, coupled to said line sensor, for setting a resolution of said line sensor;
   an image signal level correction value setting device, coupled to said resolution setting device, for setting an image signal level correction value of said image signal; and
   a control device, coupled to said image signal level correction value setting device, for calculating a moving velocity and the accumulation time of said line sensor in accordance with said resolution and said image signal level correction value.

2. The image reading device according to claim 1, wherein the moving velocity is multiplied by a first factor and the accumulation time is multiplied by a second factor.

3. The image reading device according to claim 1, further comprising:
   a gain circuit that performs an adjustment of said image signal read by said line sensor;
   a first look-up table that adjusts said image signal from said gain circuit; and
   a second look-up table that adjusts said image signal from said first look-up table.

4. The image reading device according to claim 1, wherein said line sensor comprises a charge coupled device.

5. The image reading device according to claim 1, further comprising an analog-to-digital converter that converts an analog input signal from said line sensor to a digital output signal.

6. The image reading device according to claim 5, further comprising an image processing circuit that processes the digital output signal from said analog-to-digital converter and provides an image signal to a first-in first-out buffer connected to said control device.

7. The image reading device according to claim 1, further comprising a stepping motor connected to said control device that moves said line sensor in the auxiliary scanning direction.

8. The image reading device according to claim 7, wherein said stepping motor moves said line sensor in the auxiliary scanning direction by driving a carriage, said line sensor being mounted to said carriage.

9. An image reading device, comprising:
   sensor means for reading an image on a document and outputting an image signal, said sensor means moving at a moving velocity in an auxiliary scanning direction;
   resolution setting means for setting a resolution of said sensor means;
   image signal level correction value setting means for setting an image signal level correction value of said image signal; and
   control means for calculating a moving velocity and an accumulation time of said sensor means in accordance with said resolution and said image signal level correction value.

10. The image reading device according to claim 9, wherein the moving velocity is multiplied by a first factor and the accumulation time is multiplied by a second factor.

11. The image reading device according to claim 10, further comprising:
   gain adjustment means for performing a gain adjustment of said image signal read by said sensor means;
   first fine adjustment means for adjusting said image signal from said gain adjustment means; and
   second fine adjustment means for adjusting said image signal from said first fine adjustment means.

12. The image reading device according to claim 9, wherein said sensor means comprises a charge coupled device.

13. The image reading device according to claim 9, further comprising a signal converting means for converting an analog input signal from said sensor means to a digital output signal.

14. The image reading device according to claim 13, further comprising an image processing means for processing the digital output signal from said analog-to-digital converter and for providing an image signal to a buffer means connected to said control means.

15. The image reading device according to claim 9, further comprising a motor means connected to said control means for moving said line sensor in the auxiliary scanning direction.

16. The image reading device according to claim 15, wherein said motor means moves said sensor means in the auxiliary scanning direction by driving a carriage means, said sensor means being mounted to said carriage means.

17. A method for correcting resolution of a line sensor having a moving velocity in an auxiliary scanning direction and an accumulation time for reading an image on a document, comprising the steps of:
   setting a resolution of said line sensor;
   setting an image signal level correction value of said image signal which is outputted from said line sensor;
   calculating a moving velocity and the accumulation time of said line sensor in accordance with said resolution and said image signal level correction value; and
   correcting a moving velocity and an accumulation time of the line sensor.

18. The method according to claim 17, wherein said correcting step corrects the line scanner velocity and multiplies the accumulation time by a correction factor when an output signal gain of the line scanner is not equal to 1 and a maximum output value of white chart data of the line scanner is greater than a standard value limit.

19. The method according to claim 17, wherein the moving velocity is multiplied by a first factor and the accumulation time is multiplied by a second factor.

20. The method according to claim 17, further comprising the steps of:
   performing an adjustment of the image exposure data read by said line sensor with a gain circuit;
   further adjusting the image exposure data from the gain circuit using a first look-up table; and
   adjusting the image exposure data from the first look-up table.

21. The method according to claim 17, further comprising the step of calculating a light quantity deficiency error when a maximum output value of the white chart data is not greater than a standard value limit and the gain is approximately equal to a maximum gain value.

22. The method according to claim 17, further comprising the step of calculating a light quantity over-abundance error when a maximum output value of the white chart data is greater than the standard value limit and the gain is approximately equal to 1.

23. The method according to claim 17, wherein said correcting step includes changing the carriage velocity a predetermined number of levels and multiplying the accumulation time by a correction factor when an output signal gain of the line scanner is not equal to 1 and the maximum output value of the white chart data is greater than a standard value limit.

24. The method according to claim 23, wherein said changing step includes lowering the gain by 1 level, determining an obtained gain and an obtained accumulation time, determining a maximum value output of the white chart data using the obtained gain and the obtained accumulation time, and creating a white standard measurement value to determine the predetermined number of levels and the correction factor.

25. The method according to claim 24, further comprising the step of decreasing carriage speed by n levels and multiplying the accumulation time by $2^{n/3}$, where n is an integer.

* * * * *